United States Patent
Tagliabue et al.

(10) Patent No.: US 7,375,730 B2
(45) Date of Patent: May 20, 2008

(54) GRAPHIC ENTRIES FOR INTERACTIVE DIRECTORY

(75) Inventors: Roberto Tagliabue, Boston, MA (US); Marco Susani, Boston, MA (US); Ignacio Germade, Boston, MA (US)

(73) Assignee: Motorola, Inc., Schaumburg, IL (US)

( * ) Notice: Subject to any disclaimer, the term of this patent is extended or adjusted under 35 U.S.C. 154(b) by 615 days.

(21) Appl. No.: 10/207,589

(22) Filed: Jul. 29, 2002

(65) Prior Publication Data

US 2004/0017376 A1 Jan. 29, 2004

(51) Int. Cl.
*G06T 11/20* (2006.01)
*G09G 5/00* (2006.01)

(52) U.S. Cl. ............... 345/581; 345/619; 345/440; 345/661; 345/672

(58) Field of Classification Search ............... 345/440, 345/763, 767, 772, 789, 735, 783, 790, 794, 345/810, 811, 864, 866, 853, 629, 661, 676, 345/660, 672, 619; 715/700, 772, 783, 790, 715/794, 811, 810, 815, 864, 866, 853
See application file for complete search history.

(56) References Cited

U.S. PATENT DOCUMENTS

| 5,623,590 | A | * | 4/1997 | Becker et al. ............... 345/440 |
| 6,529,724 | B1 | | 3/2003 | Khazaka et al. |
| 2003/0117432 | A1 | * | 6/2003 | Kautto-Kiovula et al. .. 345/735 |

\* cited by examiner

*Primary Examiner*—Kee M. Tung
*Assistant Examiner*—Chante Harrison
(74) *Attorney, Agent, or Firm*—Joseph T. Cygan; Hisashi D. Watanabe (57) ABSTRACT

The present invention provides an apparatus (800) and method (700) for a communication device (100) having a display for graphically organizing communication patterns (602) of the user. Visual attributes of the images associated with specific parties are varied dynamically as the communication patterns of the user with specific parties change.

18 Claims, 8 Drawing Sheets

GRAPHIC ENTRIES FOR INTERACTIVE DIRECTORY

FIELD OF INVENTION

The present invention relates to an apparatus and method for a communication device having a display. More specifically, the present invention relates to an apparatus and method for graphically organizing communication patterns of a user.

BACKGROUND OF THE INVENTION

Associating user-entered data, such as address book information, to an image on a display is known. For example, some existing devices display a plurality of images in which each image is associated with a specific entry such as an application. Other devices highlight a selected image on the display. However, these images are static and do not visually change other than being highlighted when selected. Accordingly, there is a need for an apparatus and a method for graphically organizing the images representing specific entries such as applications and calling parties. There is a further need to dynamically adjust the visual attributes of those images based upon the usages of the specific entries associated with the images.

SUMMARY OF THE INVENTION

The present invention generally relates to an apparatus and method for a communication device having a display. The present invention describes an apparatus and a method for graphically organizing communication patterns of a user such as, but not limited to the lengths and frequency of communication of the user with a specific party. The images corresponding to specific communication parties are varied based upon communication patterns of the user with the specific party. Visual attributes, such as but not limited to the size and location, of the images displayed corresponding to communicating parties are varied based upon the communication pattern of the user with the specific party. The visual attributes are varied dynamically as the communication patterns change.

DETAILED DESCRIPTION OF PREFERRED EMBODIMENTS

The present invention generally relates to an apparatus and method for a communication device having a display. The present invention describes an apparatus and a method for graphically organizing communication patterns of a user. The images corresponding to specific communication parties are varied based upon communication patterns of the user with the specific party. Visual attributes, such as but not limited to the size and location, of the images displayed corresponding to communicating parties are varied based upon the communication pattern of the user with the specific party.

A preferred embodiment of the present invention provides a display apparatus for a communication device, preferably a portable radiotelephone, to graphically organize the communication patterns of the user. Because many electronic devices have a capability to communicate, any device having a capability to communicate is considered to be a communication device, such as, but not limited to, a personal computer, personal digital assistant ("PDA"), a cellular telephone, and a cordless telephone.

Figure 1:
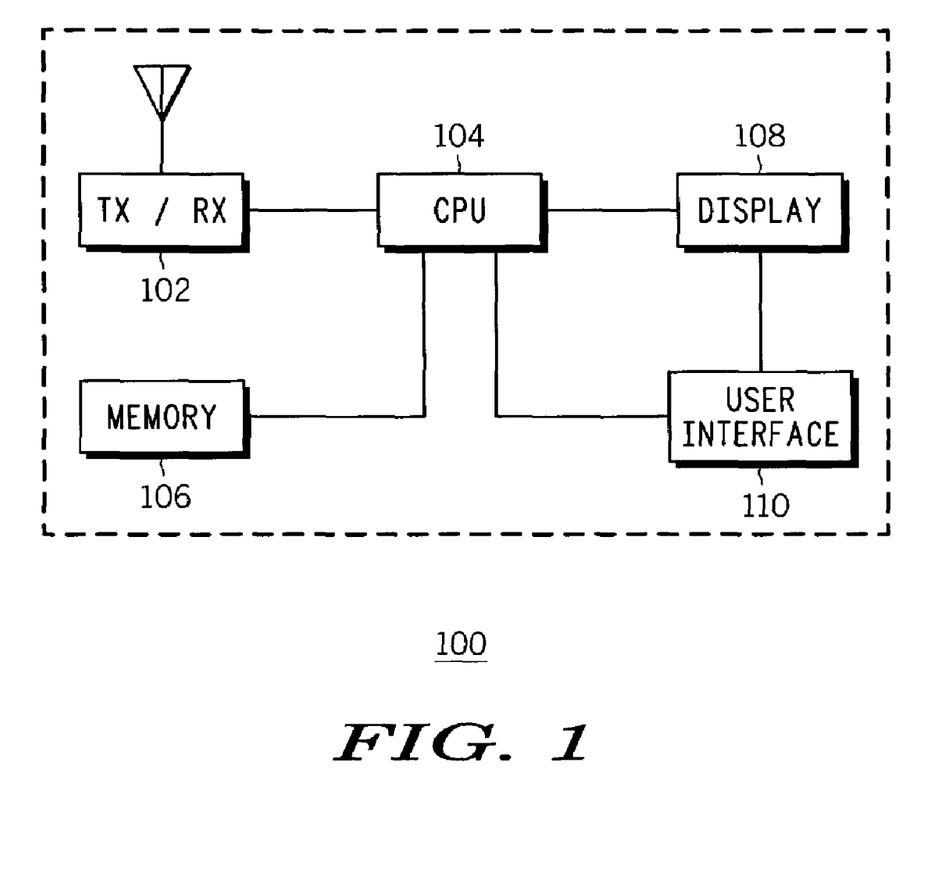
FIG. 1 is an exemplary block diagram of a preferred embodiment of the present invention illustrating a communication device.

Referring to FIG. 1, there is provided an exemplary communication device (100), preferably a portable radiophone, of the present invention. The communication device (100) comprises a transceiver (102) provides communication capabilities to and from the other components (described below) of the communication device (100) via an antenna. One or more wireless communication protocols are utilized by the communication device (100) for the preferred embodiment, but it is to be understood and wired communication protocols, often used by computer network systems, may also be utilized. Examples of wireless communication protocols that may be utilized by the transceiver (102) include, but are not limited to, Code Division Multiple Access (CDMA), Time Division Multiple Access (TDMA), Global System For Mobile Communications (GSM), Wideband Code Division Multiple Access (WCDMA), Code Division Multiple Access-3rd Generation (CDMA2000), and the like. Also, the transceiver (102) may employ other types of wireless communication protocols including, but not limited to, IEEE 802.11™ supported by the Institute of Electrical and Electronics Engineers, Inc. (such as Wi-Fi supported by the Wireless Ethernet Compatibility Alliance), Bluetooth™ supported by the Bluetooth SIG, Inc., HomeRF supported by the HomeRF Working Group Inc., paging protocols such as FLEX™, ReFLEX™, and InFLEXion™ supported by Motorola Inc. of Schaumburg, IL, and the like.

The communication device (100) also comprises a processor (104) coupled to the transceiver (102), a memory device (106) coupled to the processor, a display (108) coupled to the processor, and a user interface (110) coupled to the display and the processor. The processor (104) provides central operation of the communication device (100), such as providing outgoing data to and receiving incoming data from the transceiver (102), storing data to and accessing data from the memory device (106), and providing output data to and receiving input data from the display (108) and the user interface (110). The memory device (106) provides volatile memory and/or non-volatile memory for storage of various types of data. For the preferred embodiment, contact information of various parties, including images corresponding to the parties, is stored in the memory device (106). The display (108) provides a visual representation of the contact information, such as the images corresponding to the parties. The display (108) may also provide input data to the processor (104) from an input device (not shown) such as a touch screen associated with a surface of the display. The user interface (110) provides a user of the communication device (100) with a means for interacting with the device such as a keypad, selection/menu keys, speaker, microphone, activation switches, light indicators, and the like.

Figure 2:
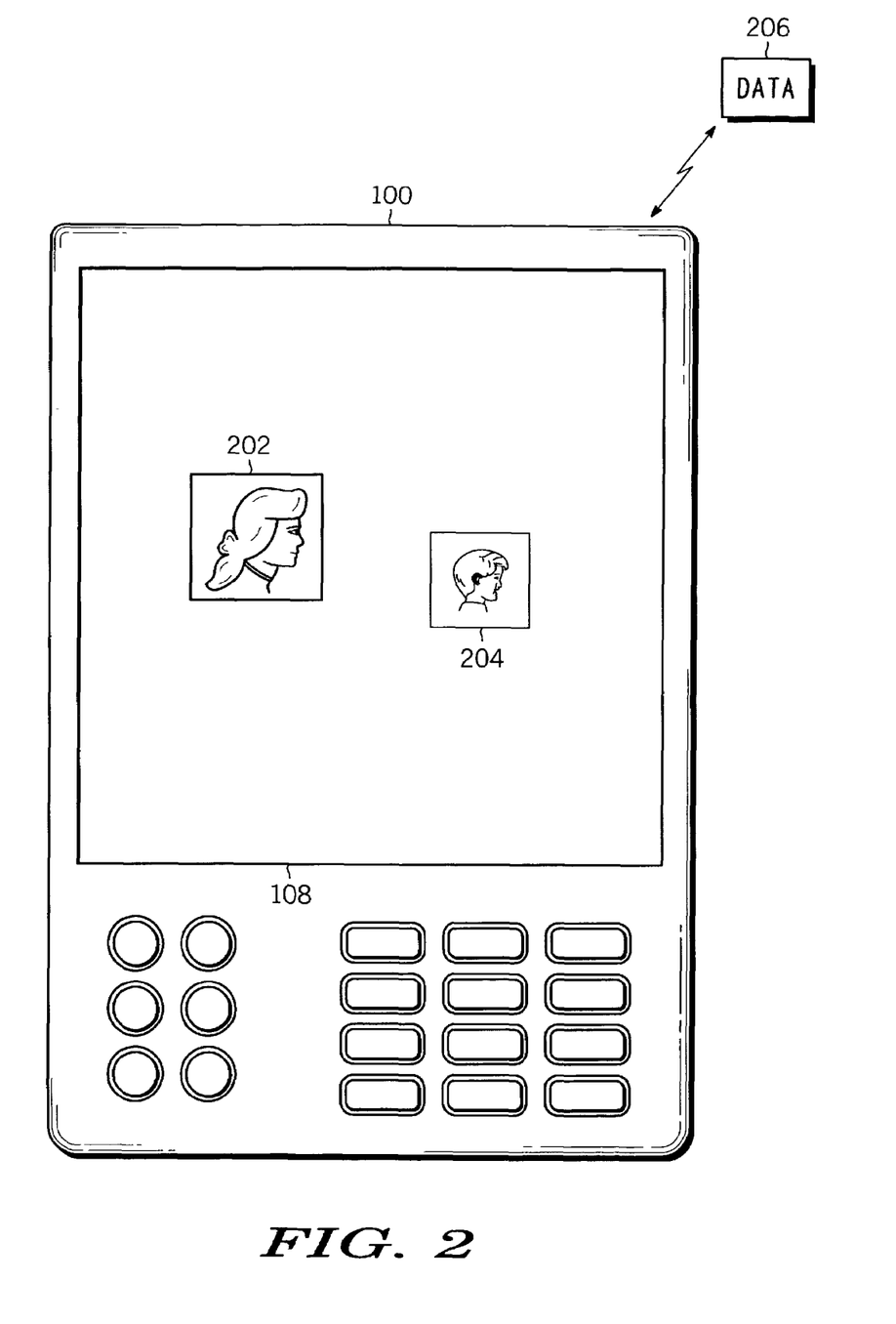
FIG. 2 is an exemplary front planar view of the communication device of FIG. 5 illustrating a first aspect of the present invention in which images vary by relative size.

FIG. 2 illustrates the communication device (100) includes an exemplary display (108) of a first aspect of the present invention comprising a first image (202) and a second image (204). Each image is associated with a specific party who has been entered in the user's database (206) with relevant information. For the preferred embodiment, the database (206) is stored in the memory device (106) shown in FIG. 1. The first image (202) represents a first communication pattern of the user with a first party of a plurality of parties and the second image (204) represents communication patterns of the user with a second party of a plurality of parties. The user interface dynamically varies the first and second images on the display based upon a variance between the first and second communication patterns. The images are varied to show the prominence of one image over the other. The images may be varied in size relative to each other proportional to or inversely proportional to the variance of the communication patterns between the first and the second parties as the communication patterns are updated.

As stated above, each image (202, 204) is preferably a representation of the associated party. For example, if the associated party is a friend, then the user may use a photograph of that person, or if the party is a business, then the logo of the business may be used. The relevant information associated with each image comprises contact information such as, but not limited to, the name of the party, telephone number, fax number, address, and e-mail address. Each image also has a communication pattern indicative of the pattern of communications between the user and each party within a predetermined time, and is updated as communication is initiated to or received from the party. The communication pattern may be based upon the total length of time that the user has communicated with the party within the predetermined time, for example within last ten days. For example, if a first party is the user's girlfriend, the user might, in the past ten days, communicate with her for the total of 300 minutes, while within the same time period, the user may communicate with a second party who is the user's brother for only 100 minutes. The communication pattern may also be based upon the total number of calls, both initiating and receiving, that the user has with a certain party within the same time period. Using the same example as above, the user may have only five calls with his girlfriend totaling 300 minutes while calling his brother ten times totaling 100 minutes. Other parameters, such as the proximity of the parties to the users, availability of other parties ("presence"), the content of the communication, and the time of day and the day of the week the calls are initiated and/or received, may be used as the communication patterns. The images are varied according to the variance in the communication patterns relative to each other, and may be varied dynamically as the communication patterns are updated.

The images may be varied in size relative to each other proportional to the variance of the communication patterns between the first and the second parties. If the communication pattern is based upon the total number of minutes of communication between the user and the party, using the numbers from the previous example, the first image (202) will be shown larger than the second image (204) as shown in FIG. 2, and the image of the party the user speaks to longest will be shown most prominently. If the communication pattern is based upon the total number of calls between the user and the party, using the numbers from the previous example, the first image (202) will be shown smaller than the second image (204), and the image of the party the user speaks to most frequently will be shown most prominently. The larger and more prominent image may assist the user to identify and to access the party more easily.

The images may also be varied in size relative to each other inversely proportional to the variance of the communication patterns between the first and the second party. Using the total number of minutes in communication from the previous example, the second image having 100 minutes will be displayed larger than the first image having 300 minutes. The larger and more prominent image may remind the user to call the party associated with the image and speak to that party more at length. If the total number of calls between the user and the party from the previous example is used, the first image will be shown larger than the first image. The larger and more prominent image may remind the user to call the party associated with the image more often.

Figure 3:
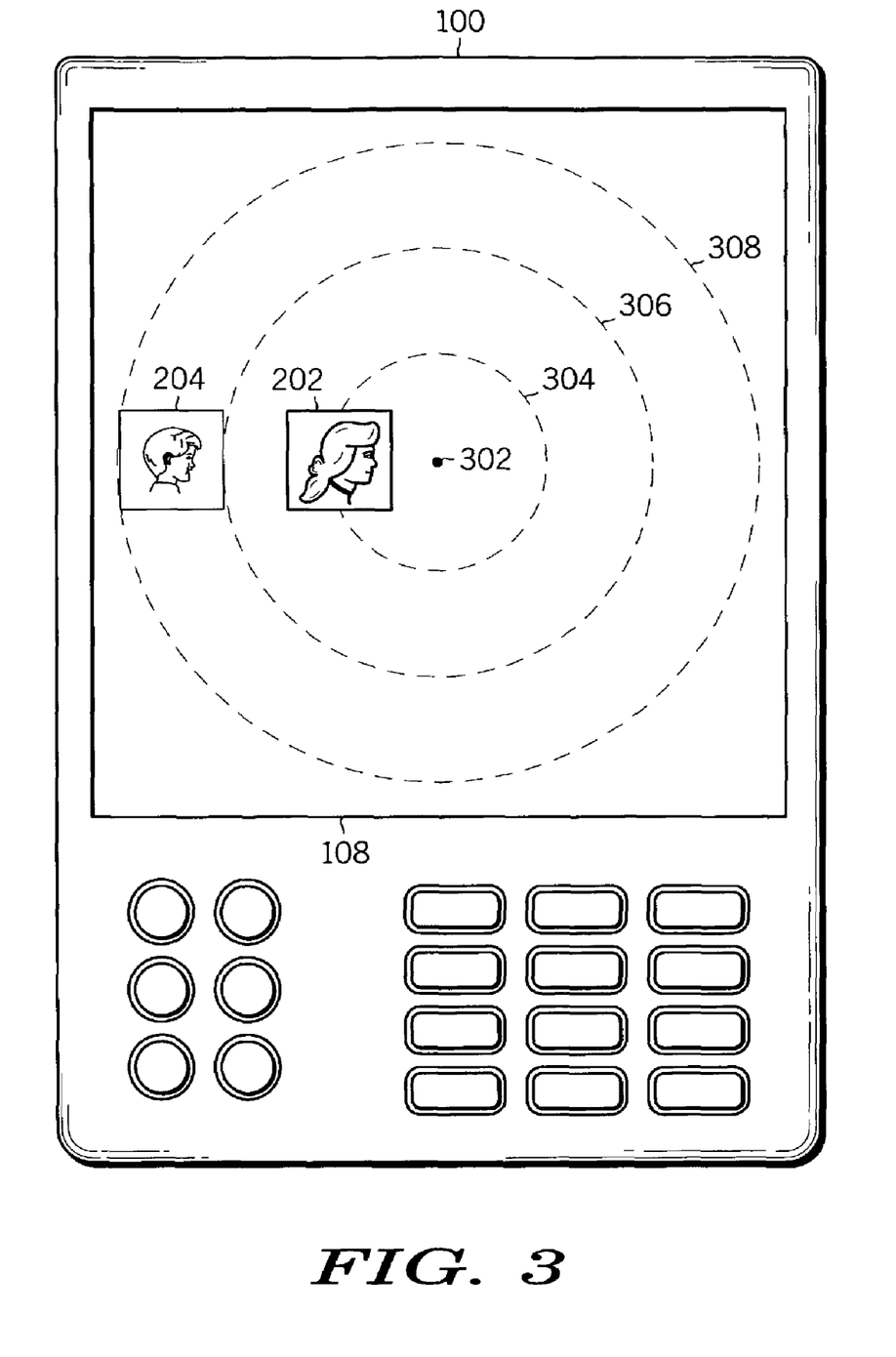
FIG. 3 is an exemplary front planar view of the communication device illustrating a second aspect of the present invention in which images vary by relative location.

FIG. 3 illustrates another example, i.e., a second aspect, of varying the images to show the prominence of one party over the other. The display (108) has a center (302) and a plurality of predefined concentric areas, and the prominence of one image over the other is shown by the location relative to the center. Three concentric areas, namely 304, 306 and 308, are shown. In FIG. 3, the first image (202) representing the first party is more prominently shown than the second image (204) representing the second party by being more centrally located than the first image. The relative proximity of each image to the center may be proportional or inversely proportional to the variance between the first and second communication patterns.

The prominence of one image over the other may be shown by other means such as, but not limited to, varying the contrast or brightness of the images, varying the colors, animating the images, varying the rate of the images flashing, and varying the resolution of the images.

Figure 4:
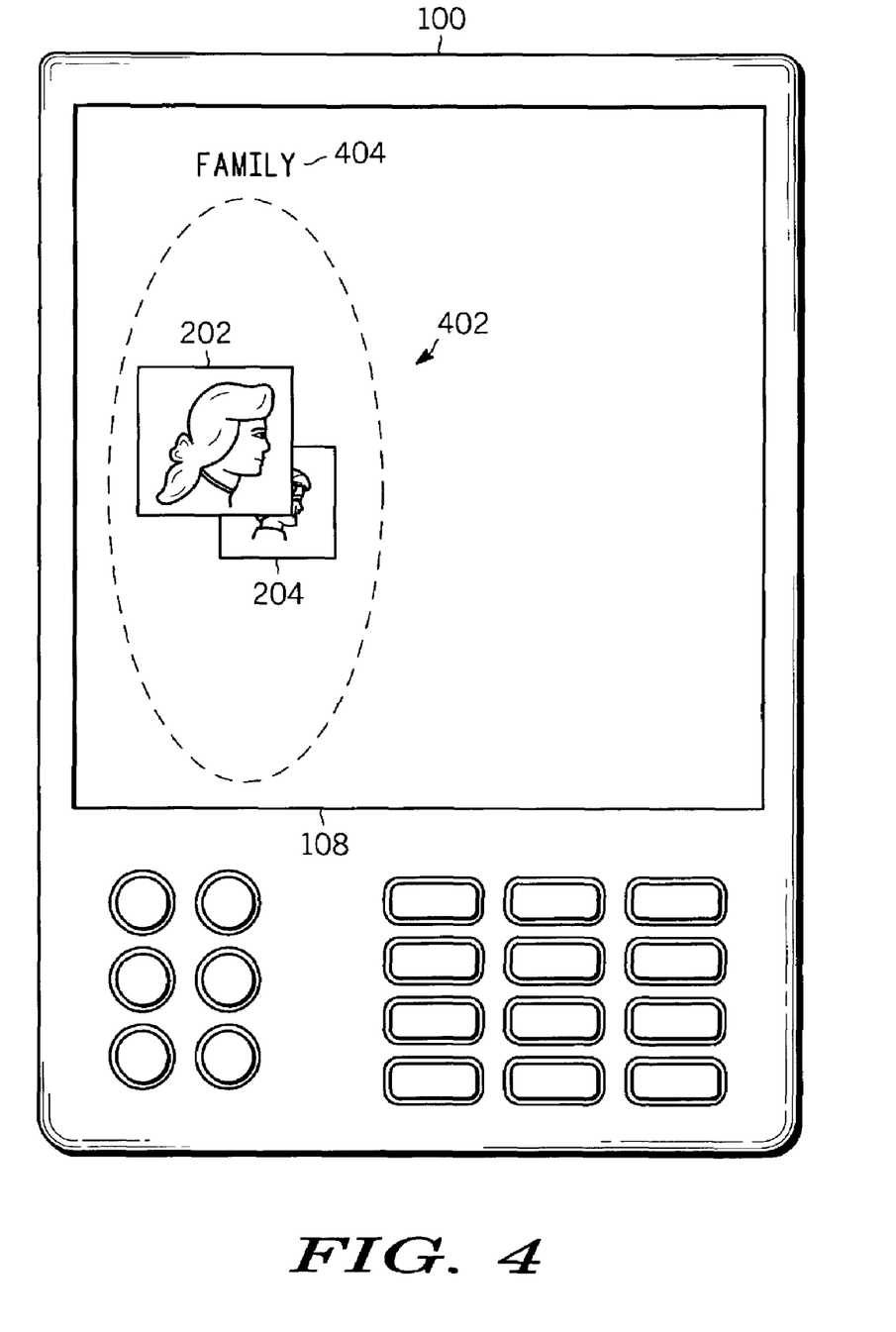
FIG. 4 is an exemplary front planar view of the communication device illustrating a third aspect of the present invention in which a group of images is shown as a cluster.

FIG. 4 illustrates a third aspect of the present invention, namely an exemplary organization of the first and second images (202, 204) as a group (402) and the representation of the group as a cluster. The group (402) is identified with a group name (404), such as the sample group name shown in FIG. 4 as "FAMILY." Group names may be established based on one or more commonality of group members, such as family members, friends, co-workers, as well as people having common interests, common backgrounds, and the like. The prominence of the first image (202) over the second image (204) resulting from the variance between the first and the second communication patterns is shown in FIG. 4 by partially overlaying the first image over the second image. The prominence of the first image (202) over the second image (204) may be additionally shown by the relative sizes of the images.

Figure 5:
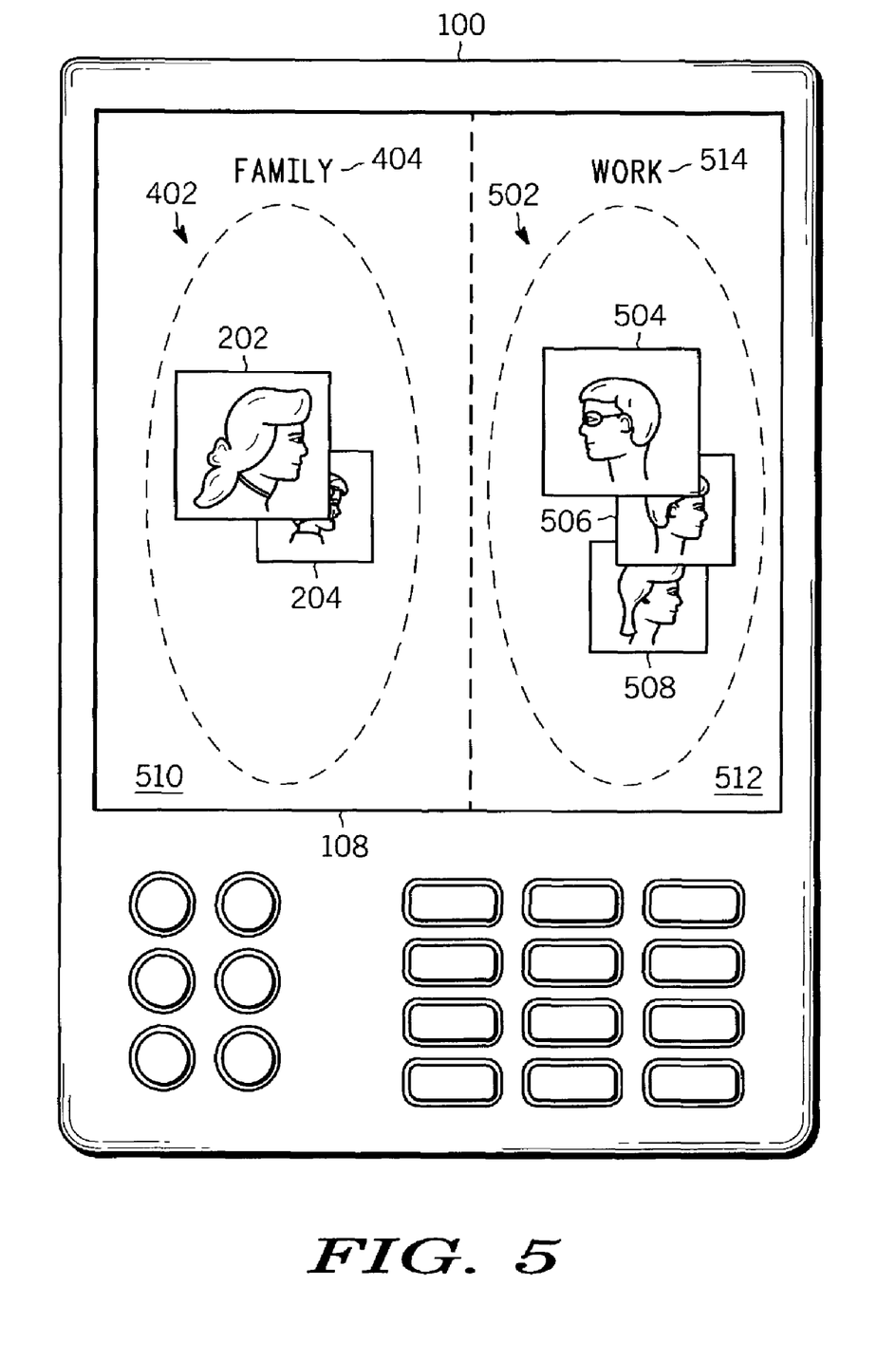
FIG. 5 is an exemplary front planar view of the communication device illustrating a fourth aspect of the present invention in which two groups of images are shown as two clusters with group names.

FIG. 5 illustrates a fourth aspect of the present invention, namely an exemplary organization of two groups on the display (108); the first group (402) comprising the first and second images (202, 204), and the second group (502) comprising third, fourth, and fifth images (504, 506, 508). All information regarding the groups is stored in the memory device (106) shown in FIG. 1, and each communication pattern is updated as communication is made.

The display has a first and second areas (510, 512). The first group (402) is associated with the first area (510), and is displayed within the first area with the first group name (404), such as, by example, "FAMILY". The second group (502) is associated with the second area (512), and is displayed in the second area with the second group name (514), such as, by example, "WORK". The relative prominence of the images within the group is based upon the variance among the communication patterns within the same group, and the images may be sized proportional to or inversely proportional to the variance. The areas occupied by the first group (402) relative to the second group (502) may be fixed, or be varied based upon the variance between the groups, such as, but not limited to the average communication pattern of each group, and the highest communication pattern of each group. The areas (510, 512) may be sized proportional to or inversely proportional to the variance. The user is then able to easily identify groups that are more active as well as parties that are more active within the group.

Each party may belong to more than one group, allowing the user to organize the parties in various groups. For example, one icon representing a party A in the WORK group may also belong to the FAMILY group, allowing the user to easily access A under either WORK or FAMILY group. The communication device (100) is capable of establishing communication with a desired party by selecting an image associated with the desired party. The communication device (100) is also capable of establishing communication with a desired group by selecting the group name.

Figure 6:
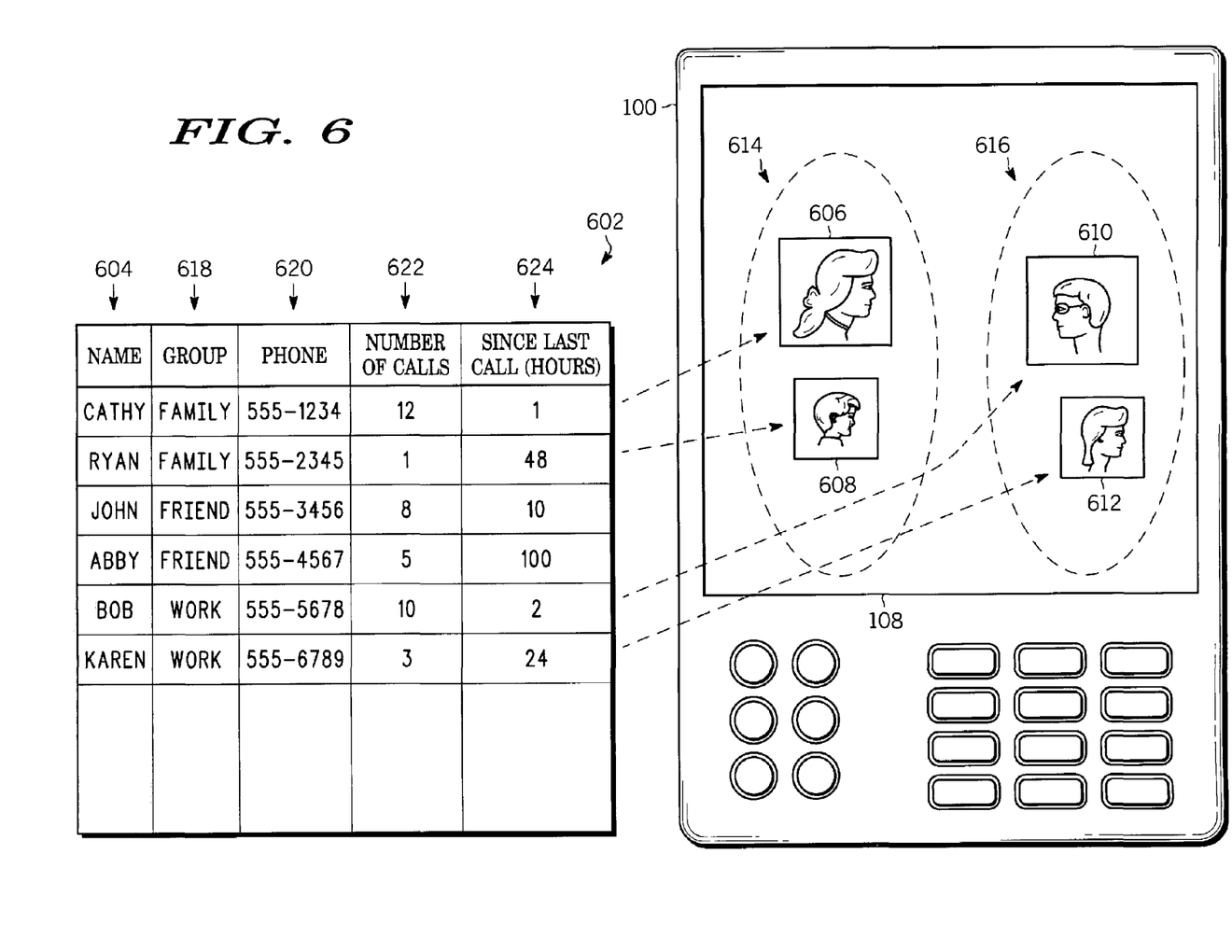
FIG. 6 is an exemplary reference diagram illustrating a relationship between phonebook entries and corresponding images displayed on the communication device.

As shown in FIG. 6, the preferred embodiment provides a directory (602) having a plurality of entries (604) for a communication device (100), preferably a portable radiotelephone, providing a plurality of icons (four shown, 606, 608, 610, 612) arranged in one or more groupings (two shown, 614, 616). Each icon is associated with a corresponding entry having a group identity (618), and has one or more visual properties. The visual properties of each icon are dynamically adjusted based upon at communication patterns of the user. The entries for the directory include telephone numbers (620), and the communication patterns of the user, such as the frequency of calls made to or received from a specific a telephone number (622) and the time elapsed between the last telephone call made to or received from the telephone number (624) of the directory, are updated as the user communicates with the parties in the directory. The visual properties of the icons, such as, but not limited to, the size, overlay sequence, and location of icons, are dynamically adjusted as one or more of the communication patterns are updated.

Figure 7:
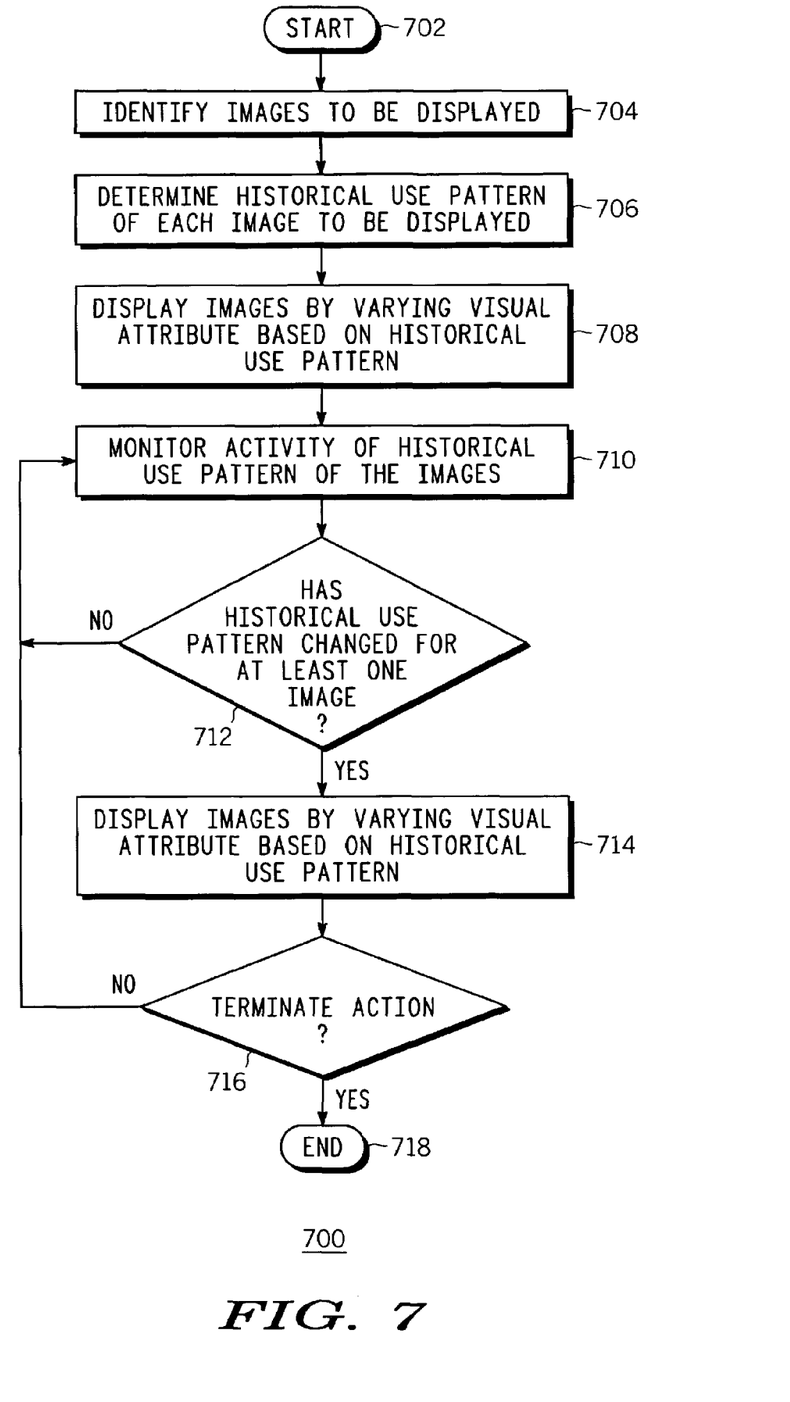
FIG. 7 is an exemplary flow diagram representing a preferred operation of the preferred embodiment of the present invention.

Referring to FIG. 7 in conjunction with FIG. 1, the present invention provides a method (700) for a communication device running an application program to dynamically update visual attributes of a plurality of images based upon the communication patterns of the user. The application may be a phonebook application with plurality of parties with each party having specific data entries such as phone number, address, e-mail address, and other relevant contact information. For the preferred embodiment, the general operation of the method (700) shown in FIG. 7 is executed and controlled by the processor (104). In step 702, the application program is initiated. In step 704, the communication device (100), preferably a wireless radiotelephone, identifies images to be displayed, which may be accomplished by the user selecting one or more of the application program entries such as an individual party or a group name representing a plurality of parties. Based upon the images identified in step 704, the communication device determines the historical use associated with each of the identified images in step 706. In step 708, the communication device (100) displays the identified images on the display (108) varying the visual attribute of each image, such as, but not limited to the size, location, color, and brightness based upon the historical use pattern. For example, the historical use pattern indicates that the user has been in communication with a first party six times in the last ten days, but in communication with a second party over the same time period only once, then the visual attribute such as the size of each image representing the corresponding party is varied proportional or inversely proportional to the historical use pattern. If the images are displayed proportional to the historical use pattern, then the first image representing the first party will be displayed larger than the second image representing the second party. If the images are displayed inversely proportional to the historical use pattern, then the first image representing the first party will be displayed smaller than the second image representing the second party.

In step 710, the communication device monitors the activity of the historical use pattern of the images while the application program is running, and in step 712, determines if the historical use pattern has changed for at least one of the images displayed. If it is determined that no change in the historical pattern has occurred, then the communication device continues to monitor the historical use pattern. If it is determined that the historical pattern for at least one of the images has changed, then the communication device varies the visual attribute of the image which has experienced a change in the historical use pattern according to the change in step 714. For example, the historical use pattern indicates that the user has been in communication with the first party for a total of 100 minutes in the last ten days, but in communication with the second party over the same time period for 50 minutes. If the images are displayed proportional to the historical use pattern, then the first image representing the first party at first will be displayed larger than the second image representing the second party. But as the user establishes communication with the second party and the total communication time increases, the size of the second image is increased relative to the size of the first image to reflect the current variance of the historical use patterns between the first and second parties.

In step 716, the communication device determines whether or not to terminate the application program. If the application is determined to continue, then the communication device continues to monitor the historical use pattern as in step 710. Otherwise, the application is terminated in step 718.

The visual attribute of each image may be varied based upon the proximity of the corresponding device responding to the communication device. For example, if the first party is located 100 yards from the user, and the second party is located three miles from the user, then the first image corresponding to the first user may displayed much larger than the second image corresponding to the second user. The plurality of images may be grouped and displayed as one or more groups based on the data entries of the application program. The plurality of images may also be grouped and displayed as one or more groups based on the time of day, and day of week.

The plurality of images may be dynamically updated by varying an arrangement of each of the plurality of images as the historical use pattern changes. For example, as the historical use pattern of the images varies, the images are rearranged such that images having higher historical use pattern, such as more frequently called numbers, are displayed according to the historical use pattern ranking from the top of the display in a descending order. The ranking may also be shown by rearranging the images such that more frequently communicated parties are more centrally located on the display, and the less frequently communicated parties are located towards the edge of the display. The images associated with the parties who have never been in communication with the user within a predetermined period may be displaced from the display.

Figure 8:
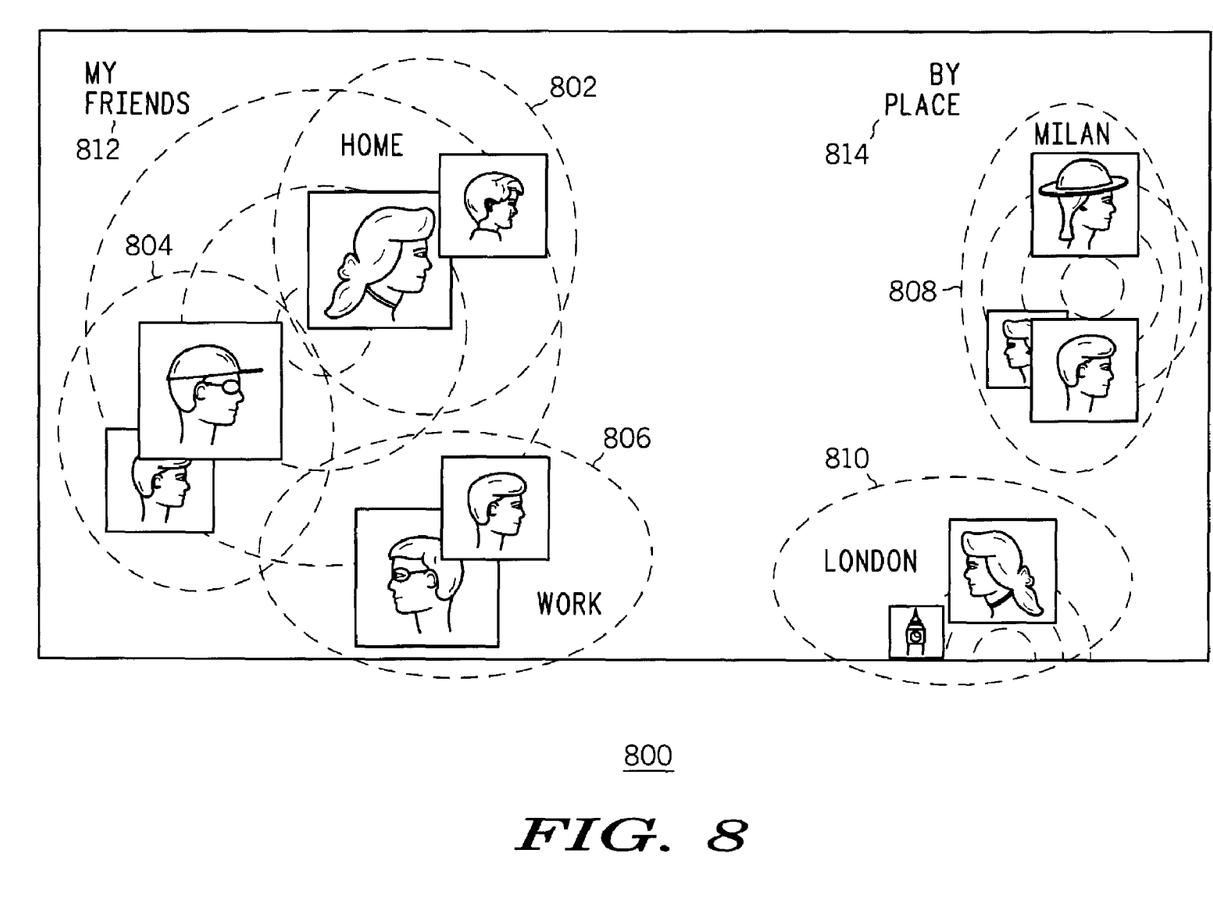
FIG. 8 illustrates an exemplary display of the present invention, the display being sectioned into several sections.

FIG. 8 illustrates an exemplary display (800) of the present invention incorporating the previous description. Five groups (802, 804, 806, 808, and 810) of a plurality of individuals are shown as five clusters. The display is sectioned into several sections with each section having concentric areas. Two of the areas representing specific groups are identified with the corresponding group names (812 and 814).

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A display for a communication device for graphically organizing communication patterns of a user, the display comprising:
 a first image displayed at a first position, the first image associated with a first party, indicative of a first communication pattern between the user and the first party within a predetermined period;
 a second image displayed at a second position, the second image associated with a second party, indicative a second communication pattern between the user and the second party within the predetermined period; and
 concentric areas having a center;
 wherein the first and second images are dynamically varied based upon a variance between the first and second communication patterns, and
 the first and second positions relative to the center are proportional to the variance,
 wherein said first communication pattern and said second communication pattern are based upon total time of communication between the first party and the user, and the second party and the user, respectively, within said predetermined period, or wherein said first communication pattern and said second communication pattern are based upon a total number of occurrences of communications between the first party and the user, and the second party and the user, respectively, within said predetermined period.

2. The display of claim 1, wherein the size of the first image and the size of the second image are varied proportional to the variance.

3. The display of claim 1, wherein the size of the first image and the size of the second image are varied inversely proportional to the variance.

4. The display of claim 1, wherein the proportionality to the variance of the first and second positions relative to the center includes inverse proportionality.

5. The display of claim 1 further comprising a first group of images comprising the first and second images wherein the first group of images is depicted on the display as a first cluster.

6. The display of claim 1 further comprising a first group of images having a first group name, the first group of images comprising the first and second images wherein the first group name is depicted on the display.

7. The display of claim 6 further comprising a first area, a second area independent of and separate from the first area, and a second group of images, the first group of images associated with the first area, and the second group of images having a second group name associated with the second area, wherein the first group name and the first group of images are depicted on the display within the first area and the second group name and the second group of images are depicted on the display within the second area.

8. A communication device for graphically organizing communication patterns of a user for communications between the user and a plurality of parties, the communication device comprising:
 a transceiver;
 a processor coupled to the transceiver;
 a memory device coupled to the processor, the memory device storing a first image representing a first communication pattern of the user with a first party of the plurality of parties, and a second image representing a second communication pattern of the user with a second party of the plurality of parties, wherein said first communication pattern and said second communication pattern are based upon total time of communication between the first party and the user, and the second party and the user, respectively, within a predetermined period, or wherein said first communication pattern and said second communication pattern are based upon a total number of occurrences of communications between the first party and the user, and the second party and the user, respectively, within a predetermined period;
 a display coupled to the processor; and
 a user interface, coupled to the display and the processor, being effective to dynamically vary the first and second images on the display based upon a variance between the first and second communication patterns,
 wherein the display includes predefined concentric areas having a center and the first and second images are displayed relative to the center proportional to the variance.

9. The communication device of claim 8, wherein the size of the first image and the size of the second image are varied proportional to the variance.

10. The communication device of claim 8, wherein the size of the first image and the size of the second image are varied inversely proportional to the variance.

11. The communication device of claim 8, wherein the first and second images displayed relative to the center proportional to the variance includes the first and second images displayed relative to the center inversely proportional to the variance.

12. The communication device of claim 8, wherein the memory device further storing a first group of images comprising the first and second images;
 wherein the processor is further effective to show the first group of images on the display as a first cluster.

13. The communication device of claim 8, wherein the memory device further storing a first group of images having a first group name, the first group of images comprising the first and second images;

wherein the processor is further effective to show the first group name on the display.

14. The communication device of claim 12 wherein the display further comprising a first area and a second area independent of and separate from the first area, the memory device further storing a second group of images, the first group of images associated with the first area, and the second group of images having a second group name associated with the second area;

wherein the processor is further effective to show the first group name and the first group of images on the display within the first area, and the second group name and the second group of images on the display within the second area.

15. The communication device of claim 8 capable of establishing communication with a desired party by selecting an image associated with the desired party.

16. The communication device of claim 14 capable of establishing communication with a desired group by selecting a group name associated with the desired group.

17. A method in a communication device for organizing a plurality of images on the display, the method comprising steps of:

displaying the plurality of images, each of the plurality of images corresponding to communications between at least two parties;

varying a visual attribute of each of the plurality of images based upon a frequency of the corresponding communications wherein said frequency of the corresponding communications defines a historical use pattern;

positioning each of the plurality of images from a common center of the display based upon the frequency of the corresponding communications wherein a position of a first image relative to said common center compared to the position of a second image relative to said common center defines a variance of said historical use pattern between said first image and said second image; and dynamically updating the visual attribute of each of the plurality of images as the historical use pattern changes.

18. The method of claim 17, varying the visual attribute of each of the plurality of images by sizing each image of the plurality of images in proportion to the frequency of the corresponding communications.

* * * * *